Oct. 5, 1926.
C. C. BRITTON
1,602,331
MACHINE FOR STUFFING HOT TAMALES, SAUSAGE, AND THE LIKE
Filed March 1, 1924     2 Sheets-Sheet 2
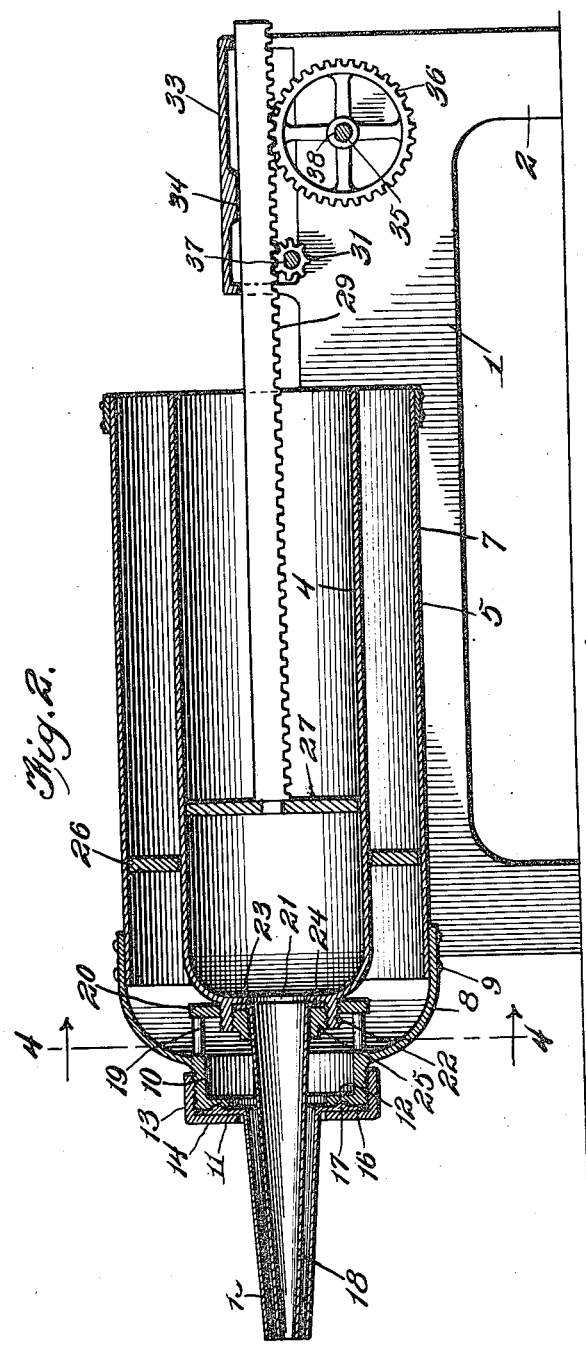
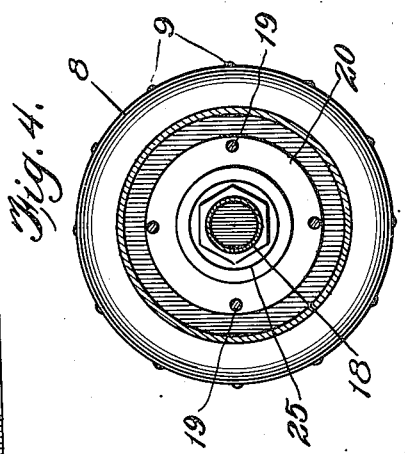
Inventor
Charles C. Britton
Atty Patented Oct. 5, 1926.

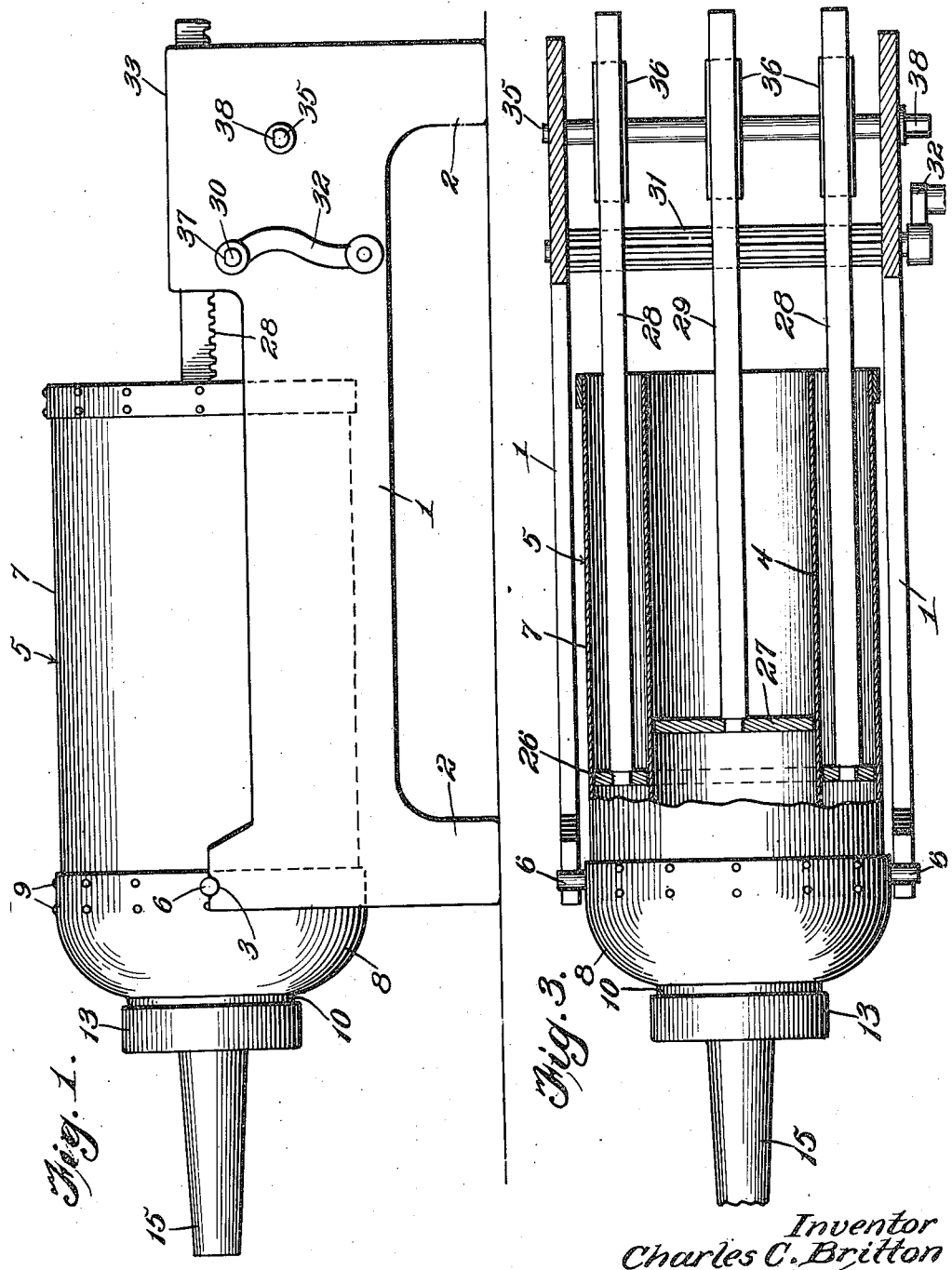

1,602,331

UNITED STATES PATENT OFFICE.

CHARLES C. BRITTON, OF LAS ANIMAS, COLORADO.

MACHINE FOR STUFFING HOT TAMALES, SAUSAGE, AND THE LIKE.

Application filed March 1, 1924. Serial No. 696,402.

It is the purpose of the present invention to provide, in a machine for stuffing hot tamales, sausage and the like, a construction wherein more than one ingredient may be stuffed into a container, one ingredient being encased within the other after the container is completely stuffed.

Another purpose is to provide, in a device of this kind, a construction including inner and outer cylinders, one mounted within the other, with tapering telescoping outlets whereby one ingredient may be forced through the outer outlet and the other ingredient forced through the inner outlet, in conjunction with means operable in the cylinders for forcing the ingredients through their respective outlets automatically and simultaneously.

Still another purpose is to provide a supporting frame for the cylinders and means for fulcruming the cylinders whereby they may be tilted for refilling when the ingredient forcing means is removed.

A further purpose is to provide means for operating said ingredient forcing or feeding means simultaneously and slowly, there being additional means for extracting said forcing or feeding means rapidly, whereby the cylinders may be permitted to tilt for refilling.

It is to be understood that the particulars herein given are in no way limitative and that, while still keeping within the scope of the invention, any desired modifications of detail and desired proportions may be made in the apparatus according to the circumstances.

The invention comprises further features and combinations of parts to be hereinafter set forth, shown in the drawings and claimed.

In the drawings:—

Figure 1 is a view in side elevation of the improved hot tamale stuffing machine constructed in accordance with the invention.

Figure 2 is a longitudinal sectional view through the same, showing the double ingredient discharging means and the inner and outer telescoping discharging or outlet tubes.

Figure 3 is a longitudinal sectional view at right angles to that shown in Figure 2, showing the three racks, two being connected to the discharging plunger of the outer cylinder and the central rack or plunger connected to the central plunger of the inner cylinder, showing the mechanism for operating all three racks.

Figure 4 is a sectional view on line 4—4 of Figure 2.

Referring to the drawings, 1 designates a frame which may be any proportions and preferably cast and provided with supporting legs 2. One end of the frame includes upstanding arms provided with bearings 3 which are axially aligned. In order to stuff hot tamales, sausage and the like, inner and outer cylinders 4 and 5 are provided, one mounted concentrically within the other. The cylinders are spaced, the outer cylinder between its wall and the wall of the inner cylinder being adapted to contain mush or other ingredient while the inner cylinder is adapted to contain meat, a mixture thereof or other ingredient, so that when the hot tamale is stuffed, the ingredient from the inner cylinder will be encased within the ingredient from the outer cylinder.

The outer cylinder has diametrically opposite axially aligned trunnions 6 which are mounted in the bearings 3 so that the cylinders may be tilted in a vertical direction for filling. The outer cylinder comprises a cylindrical wall 7 and at one end thereof a globular casting 8 which is riveted at 9 to the wall 7. This casting has a cylindrical extension 10 which is exteriorly threaded and which terminates in an inwardly extending lateral flange 11 which is grooved at 12.

A cap 13 engages the exterior threads of the extension 10. The cap has an inwardly extending annular flange 14. A tapering filling tube 15 with its flange 16 is provided. This tube engages through the cap concentrically, whereby its annular flange 16 is clamped between the flange 14 and the flange 11. The flange 16 of the tapering tube has an annular rib 17 corresponding in shape with and engaging the annular groove 12, thereby not only retaining the tapering tube concentric with the outer cylinder but also holding it concentric with the inner cylinder and concentric with an inner tapering tube 18.

The casting 8 adjacent where the extension 10 is constructed is provided with a plurality of diametrically opposite arms 19 which are constructed integrally with an annular ring 20, the inner circumference of its opening being threaded. The inner cylinder has a rounded end which has a central opening 21 and an extension collar 22 which is interiorly and exteriorly threaded. The exterior threads of the collar engage the threads in the opening of the ring 20. The diameter of the opening 21 is smaller than the diameter of the collar, in view of which a shoulder 23 is caused to be formed within the collar.

One end of the inner tapering discharge or stuffing tube has an annular flange 24 which engages the shoulder 23, there being an exteriorly threaded lock collar 25 engaging the interior threads of the collar 22, thereby clamping the flange 24 against the shoulder 23 and holding the inner tapering discharge tube 18 concentric with the two cylinders and with the outer tapering discharge tube 15. The tapering discharge tubes 15 and 18 are spaced and since the outer cylinder is filled with one ingredient and the inner cylinder is filled with another ingredient, the ingredient of the inner cylinder will be encased within the ingredient discharging from the outer cylinder, that is, when the two ingredients are stuffed into a hot tamale or other container which is adapted to fit over the outer tapering discharge tube 15. The ingredient contained in the outer cylinder passes through the space between the inner and outer tapering discharge tubes while the ingredient discharging from the inner cylinder passes through the inner tapering tube.

Mounted within the outer cylinder between its wall and the wall of the inner cylinder is a ring plunger 26 and mounted within the inner cylinder is a disk plunger 27. The ring plunger is provided with diametrically opposite racks 28 while the disk plunger is provided with a single rack 29. These racks are in parallelism and have their teeth on their under edges. One end of the frame 1 is provided with bearings for the reception of a shaft 30 on which an elongated toothed sleeve pinion 31 is fixed. This sleeve pinion engages the teeth of all three racks, so that by the use of a crank handle 32 to be detachably carried by the shaft 30, all three racks may be reciprocated in one direction simultaneously.

The plungers are arranged in the cylinders so that one operates in advance of the other but are adapted to maintain their relative positions throughout their travel through the cylinders.

One end of the frame has an upstanding portion 33 under which all three racks are guided, there being an integral boss 34 on this upstanding portion to bear upon the racks and more readily guide them and retain their teeth in mesh with the sleeve pinion 31. The same end of the frame that carries the shaft 30 also supports another shaft 35 upon which gears 36 are fast. These gears are of larger diameter than the sleeve pinion and have their teeth meshing with the teeth of the racks.

It will be noted that the shafts 30 and 35 have flat portions 37 and 38 and the ring at one end of the crank handle is correspondingly formed so that the crank handle may be used on either shaft to move with the same. Obviously, after the racks have been reciprocated in one direction by the sleeve pinion for the purpose of advancing the plungers 26 and 27 to feed or discharge the ingredients through the tapering tubes, the crank handle may be detached from the shaft 30 and applied to the shaft 35 for the purpose of withdrawing the plungers from the cylinders. The movement of the plungers in the cylinders for discharging the ingredients is relatively slow due to the diameter of the sleeve pinion. However, the movement of the plungers when being extracted from the cylinders is relatively rapid due to the larger diameters of the gears 36.

The ingredient in the outer cylinder, when discharging through the extension 10, passes between the diametrically opposite arms 19 so as to enter the space between the outer tapering discharge tube and the inner tube. The ingredient on the interior of the inner cylinder passes through the opening 21.

When the cylinders need refilling, the plungers are withdrawn and disengaged from the cylinders and the cylinders tilted on their trunnions 6, so that the cylinders may be supplied with the necessary ingredients. If necessary, the cylinders may be removed from the frame when the plungers are extracted. After the containers have been stuffed, they may be immersed in a solution of liquid smoke until the containers (which may be either hog or beef casings) are properly cured.

When the plungers are disengaged from the cylinders, their relative positions may be changed so as to secure a definite lead or lag of one over the other. With the cylinder out of the way, the plungers may be advanced by the rotation of the gears 36 until the racks are disengaged from the gears and from the pinion 31. The racks may then be reconnected with the pinion and with the gears, after having determined upon the lead or lag that one plunger will have over the other.

The invention having been set forth, what is claimed is:—

1. A container stuffing machine including inner and outer concentric cylinders with plungers operable therethrough, the outer cylinder having a tapering discharge tube, the inner cylinder having a tapering discharge tube, means operatively connecting the two cylinders for retaining the inner one concentric with the outer one, means for retaining the discharge tube of the outer cylinder concentric with the discharge of the inner cylinder, whereby a continuous passage is maintained between the two cylinders and between their discharge tubes, said plungers having racks, and selective means operable with the racks for moving the plungers through the cylinders or extracting the same, one of said plungers being in advance of the other, the construction and arrangement of the selective means and the extracting of the plungers being such as to permit the plungers to be relatively adjusted.

2. A container stuffing machine including inner and outer concentric cylinders, plungers operable therethrough, each cylinder having a tapering discharge tube of which that of the inner cylinder is enclosed by and is concentric with that of the outer cylinder, positive means for actuating the plungers, said actuating means comprising racks carried by the plungers, a pinion meshing with and common to all of the racks, and a plurality of gears of larger diameter than the pinion for meshing one with each rack, said gears being mounted on a common shaft for actuation in unison for the movement of the plungers at a higher speed than when actuated by the pinion.

In testimony whereof he affixes his signature.

CHARLES C. BRITTON.